United States Patent
Ryu et al.

(10) Patent No.: US 10,428,747 B2
(45) Date of Patent: Oct. 1, 2019

(54) SYSTEM AND METHOD FOR CONTROLLING VALVE TIMING OF CONTINUOUS VARIABLE VALVE DURATION ENGINE

(71) Applicants: HYUNDAI MOTOR COMPANY, Seoul (KR); KIA MOTORS CORPORATION, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/839,606

(22) Filed: Dec. 12, 2017

(65) Prior Publication Data

US 2018/0100446 A1    Apr. 12, 2018

Related U.S. Application Data

(63) Continuation-in-part of application No. 15/258,154, filed on Sep. 7, 2016.

(30) Foreign Application Priority Data

Dec. 11, 2015   (KR) .................. 10-2015-0177462
Nov. 20, 2017   (KR) .................. 10-2017-0154705

(51) Int. Cl.
*F01L 1/344*    (2006.01)
*F02D 13/02*    (2006.01)
(Continued)

(52) U.S. Cl.
CPC ........ *F02D 13/0207* (2013.01); *F02B 25/145* (2013.01); *F02D 13/0215* (2013.01);
(Continued)

(58) Field of Classification Search
CPC ............. F02D 13/0207; F02D 13/0261; F02D 13/0215; F02D 13/0219; F02D 41/3035;
(Continued)

(56) References Cited

U.S. PATENT DOCUMENTS 3,633,555 A    1/1972  Raggi
4,552,112 A   11/1985  Nagao et al.
(Continued)

FOREIGN PATENT DOCUMENTS

JP    H07-42514 A    2/1995
JP    H 07-324610 A   12/1995
(Continued)

OTHER PUBLICATIONS

Final Office Action dated Sep. 6, 2018 from the corresponding U.S. Appl. No. 15/258,154, 15 pages.
(Continued)

*Primary Examiner* — Hai H Huynh
*Assistant Examiner* — Gonzalo Laguarda
(74) *Attorney, Agent, or Firm* — Brinks Gilson & Lione

(57) ABSTRACT

A method for controlling intake and exhaust valves of an engine includes: controlling, by an intake continuous variable valve timing (CVVT) device and an exhaust CVVT device, opening and closing timings of the intake valve and exhaust valves; determining, by a controller, a target opening duration of the intake and exhaust valves based on an engine load and an engine speed; modifying, by an intake continuous variable valve duration (CVVD) device and by an exhaust CVVD device, current opening and closing timings of the intake valve and/or exhaust valve based on the
(Continued)

target opening duration; and advancing or retarding, by the intake and/or exhaust CVVD devices, the current opening timing of the intake and exhaust valves while simultaneously retarding or advancing the current closing timing of the intake and exhaust valve by a predetermined value based on the target opening duration.

16 Claims, 12 Drawing Sheets

(51) Int. Cl.
 F02D 41/00 (2006.01)
 F02B 25/14 (2006.01)
 F02D 9/02 (2006.01)
(52) U.S. Cl.
 CPC ..... *F02D 13/0219* (2013.01); *F02D 13/0261* (2013.01); *F02D 41/0007* (2013.01); *F02D 41/009* (2013.01); *F02D 2009/0235* (2013.01); *F02D 2041/001* (2013.01); *F02D 2041/002* (2013.01); *F02D 2200/023* (2013.01); *F02D 2200/04* (2013.01); *F02D 2200/0404* (2013.01); *F02D 2200/101* (2013.01); *F02D 2200/1002* (2013.01); *F02D 2200/501* (2013.01); *F02D 2200/602* (2013.01); *Y02T 10/144* (2013.01); *Y02T 10/18* (2013.01)
(58) Field of Classification Search
 CPC .... F02D 41/0007; F02D 41/009; F02D 41/26; F02D 41/0002; F02D 2041/001; F02D 2200/101; Y02T 10/128; F02B 25/00; F02B 25/145
 See application file for complete search history.

(56) References Cited

U.S. PATENT DOCUMENTS

| | | | |
|---|---|---|---|
| 5,080,055 A | 1/1992 | Komatsu et al. | |
| 5,121,733 A | 6/1992 | Goto et al. | |
| 5,161,497 A | 11/1992 | Simko et al. | |
| 5,224,460 A | 7/1993 | Haystad et al. | |
| 5,419,301 A | 5/1995 | Schechter | |
| 5,421,308 A | 6/1995 | Hitomi et al. | |
| 5,429,100 A | 7/1995 | Goto et al. | |
| 5,450,824 A | 9/1995 | Yamane et al. | |
| 5,469,818 A | 11/1995 | Yoshioka et al. | |
| 5,553,573 A | 9/1996 | Hara et al. | |
| 5,622,144 A | 4/1997 | Nakamura et al. | |
| 5,687,681 A | 11/1997 | Hara | |
| 5,698,779 A | 12/1997 | Yoshioka | |
| 5,778,840 A | 7/1998 | Murata et al. | |
| 5,809,955 A | 9/1998 | Murata et al. | |
| 5,924,334 A | 7/1999 | Hara et al. | |
| 5,992,361 A | 11/1999 | Murata et al. | |
| 6,006,707 A | 12/1999 | Ito | |
| 6,318,343 B1 | 11/2001 | Nakagawa et al. | |
| 6,336,436 B1 | 1/2002 | Miyakubo et al. | |
| 6,553,949 B1 | 4/2003 | Kolmanovsky et al. | |
| 6,619,242 B2 | 9/2003 | Kaneko | |
| 6,837,199 B2 | 1/2005 | Matsuura et al. | |
| 7,793,625 B2 | 9/2010 | Nakamura et al. | |
| 7,823,550 B2 | 11/2010 | Murata | |
| 8,205,587 B2 | 6/2012 | Murata et al. | |
| 8,235,015 B2 | 8/2012 | Murata | |
| 8,677,957 B2 | 3/2014 | Goto et al. | |
| 8,887,691 B2 | 11/2014 | Chen et al. | |
| 9,863,331 B2 | 1/2018 | Ryu et al. | |
| 9,863,340 B2 | 1/2018 | Ryu et al. | |
| 9,874,153 B2 | 1/2018 | Ryu et al. | |
| 9,874,154 B2 | 1/2018 | Ryu et al. | |
| 9,879,619 B2 | 1/2018 | Ryu et al. | |
| 9,889,838 B2 | 2/2018 | Ryu et al. | |
| 9,903,281 B2 | 2/2018 | Ryu et al. | |
| 9,932,883 B2 | 4/2018 | Iwai et al. | |
| 9,932,908 B2 | 4/2018 | Ryu et al. | |
| 9,964,050 B2 | 5/2018 | Ryu et al. | |
| 10,006,378 B2 | 6/2018 | Ryu et al. | |
| 2001/0025615 A1* | 10/2001 | Nohara | F01L 13/0021 123/90.15 |
| 2001/0032605 A1 | 10/2001 | Kadowaki | |
| 2001/0050067 A1 | 12/2001 | Sato | |
| 2002/0043243 A1 | 4/2002 | Majima | |
| 2003/0131805 A1* | 7/2003 | Yang | F01L 1/34 123/27 R |
| 2004/0099244 A1 | 5/2004 | Matsuura et al. | |
| 2005/0205069 A1 | 9/2005 | Lewis et al. | |
| 2005/0235933 A1 | 10/2005 | Arai et al. | |
| 2006/0037571 A1 | 2/2006 | Machida | |
| 2006/0266311 A1 | 11/2006 | Fujii | |
| 2007/0181096 A1 | 8/2007 | Wagner et al. | |
| 2007/0272202 A1 | 11/2007 | Kuo et al. | |
| 2008/0029050 A1 | 2/2008 | Ichmura et al. | |
| 2008/0300773 A1 | 12/2008 | Winstead | |
| 2008/0308053 A1* | 12/2008 | Tsuchida | F01L 1/022 123/90.17 |
| 2009/0007564 A1 | 1/2009 | Suzuki et al. | |
| 2009/0007867 A1 | 1/2009 | Tanabe et al. | |
| 2009/0031973 A1 | 2/2009 | Murata | |
| 2009/0241877 A1 | 10/2009 | Hoshikawa | |
| 2009/0272363 A1 | 11/2009 | Yun et al. | |
| 2009/0277434 A1 | 11/2009 | Surnilla | |
| 2010/0023242 A1 | 1/2010 | Kawamura | |
| 2010/0217504 A1 | 8/2010 | Fujii et al. | |
| 2012/0000197 A1 | 1/2012 | Maruyama et al. | |
| 2012/0004826 A1 | 1/2012 | Shimo et al. | |
| 2013/0146006 A1 | 6/2013 | Kim et al. | |
| 2013/0146037 A1 | 6/2013 | Han et al. | |
| 2013/0206104 A1 | 8/2013 | Kuhlmeyer et al. | |
| 2013/0213332 A1 | 8/2013 | Yano et al. | |
| 2013/0276731 A1 | 10/2013 | Yano et al. | |
| 2014/0165963 A1 | 6/2014 | Langham | |
| 2015/0034052 A1 | 2/2015 | Shimizu | |
| 2015/0114342 A1* | 4/2015 | Iwai | F02M 26/25 123/305 |
| 2015/0167508 A1 | 6/2015 | Ha | |
| 2015/0167509 A1 | 6/2015 | Ha | |
| 2016/0090877 A1 | 3/2016 | Kim et al. | |
| 2017/0082036 A1 | 3/2017 | Kwon et al. | |
| 2017/0082037 A1 | 3/2017 | Ryu et al. | |
| 2017/0089230 A1 | 3/2017 | Son et al. | |
| 2017/0114680 A1 | 4/2017 | Kim | |
| 2017/0167318 A1 | 6/2017 | Ryu et al. | |
| 2017/0167323 A1 | 6/2017 | Son et al. | |
| 2017/0167393 A1 | 6/2017 | Ryu et al. | |
| 2017/0167394 A1 | 6/2017 | Ryu et al. | |
| 2017/0167396 A1 | 6/2017 | Ryu et al. | |
| 2017/0167398 A1 | 6/2017 | Ryu et al. | |
| 2017/0167399 A1 | 6/2017 | Ryu et al. | |
| 2017/0167400 A1 | 6/2017 | Ryu et al. | |
| 2017/0167401 A1 | 6/2017 | Ryu et al. | |
| 2017/0167402 A1 | 6/2017 | Ryu et al. | |
| 2017/0167403 A1 | 6/2017 | Ryu et al. | |
| 2017/0167404 A1 | 6/2017 | Ryu et al. | |
| 2017/0167405 A1 | 6/2017 | Ryu et al. | |
| 2017/0167406 A1 | 6/2017 | Ryu et al. | |
| 2017/0167407 A1 | 6/2017 | Ryu et al. | |
| 2017/0167408 A1 | 6/2017 | Ryu et al. | |
| 2017/0167409 A1 | 6/2017 | Ryu et al. | |
| 2017/0167414 A1 | 6/2017 | Ryu et al. | |
| 2017/0234243 A1 | 8/2017 | Ryu et al. | |
| 2017/0268435 A1 | 9/2017 | Ryu et al. | |
| 2017/0268436 A1 | 9/2017 | Ryu et al. | |
| 2017/0268437 A1 | 9/2017 | Ryu et al. | |
| 2017/0284235 A1 | 10/2017 | Son et al. | |
| 2017/0284238 A1 | 10/2017 | Son et al. | |
| 2018/0073455 A1 | 3/2018 | Barra | |
| 2018/0100444 A1 | 4/2018 | Ryu et al. | |
| 2018/0100445 A1 | 4/2018 | Ryu et al. | |
| 2018/0100446 A1 | 4/2018 | Ryu et al. | |
| 2018/0100447 A1 | 4/2018 | Ryu et al. | |
| 2018/0100448 A1 | 4/2018 | Ryu et al. | |

(56) References Cited

U.S. PATENT DOCUMENTS

2018/0100452 A1 4/2018 Ryu et al.
2018/0100453 A1 4/2018 Ryu et al.
2018/0100454 A1 4/2018 Ryu et al.

FOREIGN PATENT DOCUMENTS

| JP | 2005-098150 | | 4/2005 |
|----|----|----|----|
| JP | 2006-046293 | A | 2/2006 |
| JP | 2010-216464 | A | 9/2010 |
| KR | 10-0321206 | B1 | 1/2002 |
| KR | 10-2009-0013007 | A | 2/2009 |
| WO | 2013-171830 | A1 | 11/2013 |

OTHER PUBLICATIONS

Non-Final Office Action dated Sep. 7, 2018 from the corresponding U.S. Appl. No. 15/839,581, 15 pages.
Non-Final Office Action dated May 20, 2018 from the corresponding U.S. Appl. No. 15/258,043, 9 pages.
Notice of Allowance dated May 16, 2018 from the corresponding U.S. Appl. No. 15/340,742, 52 pages.
Non-Final Office Action dated Aug. 24, 2018 from the corresponding U.S. Appl. No. 15/840,079, 41 pages.
Notice of Allowance dated Mar. 18, 2019 from the corresponding U.S. Appl. No. 15/839,581, 14 pages.
Final Office Action dated Mar. 18, 2019 from corresponding U.S. Appl. No. 15/840,079, 31 pages.
Non-Final Office Action dated Oct. 5, 2018 from the corresponding U.S. Appl. No. 15/839,626, 19 pages.
Non-Final Office Action dated Oct. 10, 2018 from the corresponding U.S. Appl. No. 15/839,596, 29 pages.
Non-Final Office Action dated Dec. 11, 2018 from the corresponding U.S. Appl. No. 15/258,043, 18 pages.
Extended European Search Report dated Mar. 4, 2019 from the corresponding European Application No. 18201117.1 (9 pages).
Non-Final Office Action dated Jul. 9, 2019 from the corresponding U.S. Appl. No. 15/839,624, 9 pages.

* cited by examiner

FIG. 8C
FIG. 8D
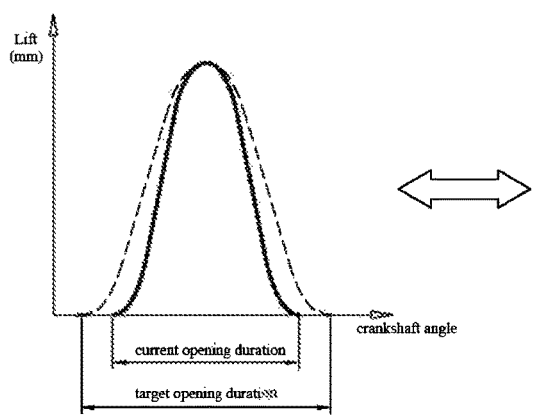
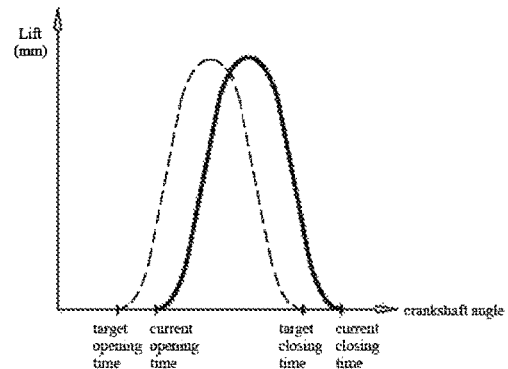

IVD map
(Unit : Crank angle)

IVO timing map
(Unit : Before TDC)

IVC timing map
(Unit : After BDC)

EVD map
(Unit : Crank angle)

EVO timing map
(Unit : Before BDC)

EVC timing map
(Unit : After TDC)

SYSTEM AND METHOD FOR CONTROLLING VALVE TIMING OF CONTINUOUS VARIABLE VALVE DURATION ENGINE

CROSS-REFERENCE TO RELATED APPLICATIONS

This application is a continuation-in-part application of U.S. patent application Ser. No. 15/258,154 and claims priority to and the benefit of Korean Patent Application Nos. 10-2015-0177462, filed on Dec. 11, 2015, and 10-2017-0154705, filed on Nov. 20, 2017, the entirety each of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) should be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve.

In addition, the CVVT device may advance or delay the opening or closing timing of the valve in a state that the opening duration of the valve is fixed. That is, if the opening timing of the valve is determined, the closing timing is automatically determined according to the opening duration of the valve.

However, in case of combining the CVVD device and the CVVT device, both the opening duration and timing of the valve should be simultaneously controlled.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a system and a method for controlling valve timing of a continuous variable valve duration engine that simultaneously controls duration and timing of the valve being equipped with a continuous variable duration device and a continuous variable valve timing device disposed on intake valve side and exhaust valve side of a turbo engine vehicle by independently controlling an opening and closing timing of an intake valve and an exhaust valve.

The present disclosure provides a method for controlling valve timing of a turbo engine provided with both a continuous variable duration (CVVD) device and a continuous variable valve timing (CVVT) device at an intake valve and exhaust valve sides respectively. The method for controlling intake and exhaust valves of an engine includes: controlling, by an intake CVVT device, opening and closing timings of the intake valve; controlling, by an exhaust CVVT device, opening and closing timing of the exhaust valve; determining, by a controller, a target opening duration of the intake valve, a target opening duration of the exhaust valve, and at least one of a target opening timing or a target closing timing of the intake valve and the exhaust valve, based on an engine load and an engine speed; modifying, by an intake CVVD device, current opening and closing timings of the intake valve based on the target opening duration of the intake valve; modifying, by an exhaust CVVD device, the current opening and closing timings of the exhaust valve based on the target opening duration of the exhaust valve; advancing, by the intake CVVD device, the current opening timing of the intake valve while simultaneously retarding the current closing timing of the intake valve by a predetermined value, or retarding the current opening timing of the intake valve while simultaneously advancing the current closing timing of the intake valve by a predetermined value, based on the target opening duration of the intake valve; and advancing, by the exhaust CVVD device, the current opening timing of the exhaust valve while simultaneously retarding the current closing timing of the exhaust valve by a predetermined value, or retarding the current opening timing of the exhaust valve while simultaneously advancing the current closing timing of the exhaust valve by a predetermined value, based on the target opening duration of the exhaust valve.

In one form, the intake CVVD device advances the current opening timing of the intake valve while simultaneously retarding the current closing timing of the intake valve when the target opening duration of the intake valve is longer than a duration between the current opening timing and current closing timing of the intake valve.

In another form, the intake CVVD device retards the current opening timing of the intake valve while simultaneously advancing the current closing timing of the intake valve when the target opening duration of the intake valve is shorter than a duration between the current opening timing and current closing timing of the intake valve.

In addition, The exhaust CVVD device advances the current opening timing of the exhaust valve while simultaneously retarding the current closing timing of the exhaust valve when the target opening duration of the exhaust valve is longer than a duration between the current opening timing and current closing timing of the exhaust valve.

In other form, the exhaust CVVD device retards the current opening timing of the exhaust valve while simultaneously advancing the current closing timing of the exhaust valve when the target opening duration of the exhaust valve is shorter than a duration between the current opening timing and current closing timing of the exhaust valve.

The method further includes the step of adjusting, by the intake CVVT device, the current opening and closing timings of the intake valve to the target opening and closing timings of the intake valve, respectively.

The method further includes the step of adjusting, by the exhaust CVVT device, the current opening and closing timings of the exhaust valve to the target opening and closing timings of the exhaust valve, respectively.

In one form, during the step of determining the target opening duration of the intake valve, the controller sets the target opening duration of the intake valve to a first intake opening duration in a first control region where the engine load is between first and second predetermined loads, and the controller controls the intake CVVD device to adjust a current intake opening duration to the first intake opening duration.

In another form, during the step of determining the target opening duration of the intake valve, the controller sets the target opening duration of the intake valve to a second intake opening duration in a second control region where the engine load is greater than the second predetermined load and equal to or less than a third predetermined load, and the controller controls the intake CVVD device to adjust the current intake opening duration to the second intake opening duration, and wherein the second opening duration is longer than the first intake opening duration.

During the step of determining the target opening duration of the exhaust valve, the controller sets the target opening duration of the exhaust valve to a first exhaust opening duration in a first control region where the engine load is between first and second predetermined loads, and the controller controls the exhaust CVVD device to adjust a current exhaust opening duration to the first exhaust opening duration.

During the step of determining the target opening duration of the exhaust valve, the controller sets the target opening duration of the exhaust valve to a second exhaust opening duration in a second control region where the engine load is greater than the second predetermined load and equal to or less than a third predetermined load, and the controller controls the exhaust CVVD device to adjust the current exhaust opening duration to the second exhaust opening duration, and wherein the second exhaust opening duration is longer than the first exhaust opening duration.

The method further includes the step of determining, by the controller, a third control region where the engine load is greater than a third predetermined load and less than a fourth predetermined load and the engine speed is between first and second predetermined speeds, or where the engine load is greater than the third predetermined load and equal to or less than a fifth predetermined load and the engine speed is between the second predetermined speed and a third predetermined speed; and advancing, by the intake CVVT device in the third control region, the current closing timing of the intake valve to be approximately at a bottom dead center (BDC) when the engine speed is less than a predetermined speed; or advancing the current closing timing of the intake valve to an angle after BDC when the engine speed is greater than or equal to the predetermined speed.

In the third control region, the exhaust CVVT device advances the current closing timing of the exhaust valve to be approximately at a top dead center while keeping an exhaust valve opening (EVO) timing up.

The method further comprises the step of determining a fourth control region, by the controller, where the engine load is greater than a fourth predetermined load and equal to or less than a fifth predetermined load and the engine speed is equal to or greater than a first predetermined speed and equal to or less than a second predetermined speed; and controlling, by the intake CVVT device in the fourth control region, the current closing timing of the intake valve to be approximately at a bottom dead center, the current opening timing of the intake valve to be approximately at a top dead center (TDC), and the current closing timing of the exhaust valve to be approximately at the TDC.

The method further includes the step of determining, by the controller, a fifth control region where the engine load is greater than a fifth predetermined load and equal to or less than a maximum engine load and the engine speed is between first and second predetermined speeds, and advancing, by the intake CVVT device, the current opening timing of the intake valve opening (IVO) to be an angle before a top dead center and retarding the current closing timing of the intake valve to be an angle after a bottom dead center such that an fresh air introduced into a cylinder evacuates a combustion gas from the cylinder.

In the fifth control region, the exhaust CVVT device may retard the current opening timing of the exhaust valve to be an angle after a bottom dead center so as to reduce interference of exhaust and controlling the current closing timing of the exhaust valve to an angle after a top dead center to maintain a catalyst temperature.

The method further includes the step of determining, by the controller, a sixth control region where the engine load is greater than a fifth predetermined load and equal to or less than a maximum engine load and the engine speed is greater than a second predetermined speed and equal to or less than a third predetermined speed; and advancing, by the exhaust CVVT device in the sixth control region, the current opening timing of the exhaust valve to be an angle before a bottom dead center to inhibit an exhaust pumping and to lower boost pressure, and controlling the current closing timing of the exhaust valve to be approximately at a top dead center.

In another form of the present disclosure, a method for controlling intake and exhaust valves of an engine may include: controlling, by an intake continuous variable valve timing (CVVT) device, opening and closing timings of the intake valve; controlling, by an exhaust CVVT device, opening and closing timing of the exhaust valve; determining, by a controller, a target opening duration of the intake valve, a target opening duration of the exhaust valve and at least one of a target opening timing or a target closing timing of the intake valve and the exhaust valve, based on an engine load and an engine speed; modifying, by an intake continuous variable valve duration (CVVD) device, current opening and closing timings of the intake valve based on the target opening duration of the intake valve; modifying, by an exhaust CVVD device, current opening and closing timings of the exhaust valve based on the target opening duration of the exhaust valve; advancing or retarding, by the intake CVVD device, the current closing timing of the intake valve by a predetermined value based on the target opening duration of the intake valve while maintaining the current opening timing of the intake valve; and advancing or retarding, by the exhaust CVVD device, the current closing timing of the exhaust valve by a predetermined value based on the target opening duration of the exhaust valve while maintaining the current opening timing of the exhaust valve.

In other form, a method for controlling intake and exhaust valves of an engine may include: controlling, by an intake continuous variable valve timing (CVVT) device, opening and closing timings of the intake valve; controlling, by an exhaust CVVT device, opening and closing timing of the exhaust valve; determining, by a controller, a target opening duration of the intake valve, a target opening duration of the exhaust valve and at least one of a target opening timing or a target closing timing of the intake valve and the exhaust valve, based on an engine load and an engine speed; modifying, by an intake continuous variable valve duration (CVVD) device, current opening and closing timings of the intake valve based on the target opening duration of the intake valve; modifying, by an exhaust CVVD device, current opening and closing timings of the exhaust valve based on the target opening duration of the exhaust valve; advancing or retarding, by the intake CVVD device, the current opening timing of the intake valve by a predetermined value based on the target opening duration of the intake valve while maintaining the current closing timing of the intake valve; and advancing or retarding, by the exhaust CVVD device, the current opening timing of the exhaust valve by a predetermined value based on the target opening duration of the exhaust valve while maintaining the current closing timing of the exhaust valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which:

FIGS. 8A-8D illustrate a change of an opening duration and opening and closing timings of a valve;

Figure 1:
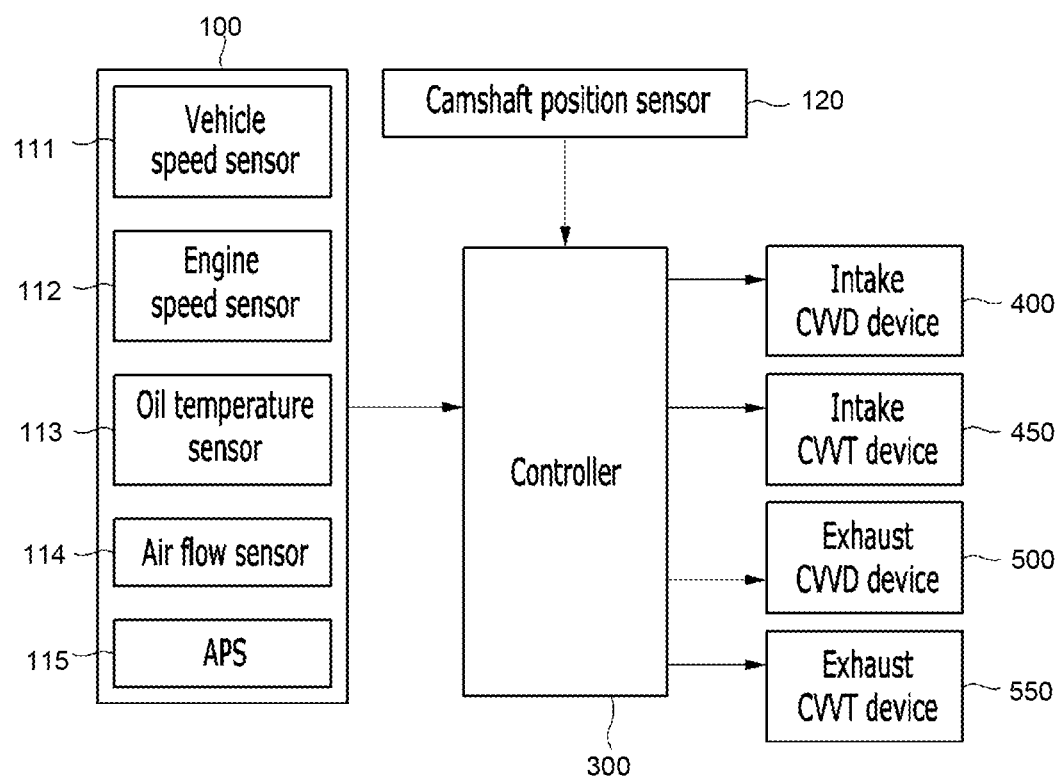
FIG. 1 is a schematic block diagram showing a system for controlling valve timing of a continuous variable valve duration engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller.

The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

An engine may be a turbo engine provided with a turbocharger.

As shown in FIG. 1, a system for controlling valve timing of a continuous variable valve duration engine includes: a data detector 100, a camshaft position sensor 120, a controller 300, an intake continuous variable valve duration (CVVD) device 400, an intake continuous variable valve timing (CVVT) device 450, an exhaust continuous variable valve duration (CVVD) device 500, and an exhaust continuous variable valve timing (CVVT) device 550.

The data detector 100 detects data related to a running state of the vehicle for controlling the CVVD devices and the CVVT devices, and includes: a vehicle speed sensor 111, an engine speed sensor 112, an oil temperature sensor 113, an air flow sensor 114, and an accelerator pedal position sensor 115.

The vehicle speed sensor 111 detects a vehicle speed, transmits a corresponding signal to the controller 300, and may be mounted at a wheel of the vehicle.

The engine speed sensor 112 detects a rotation speed of the engine from a change in phase of a crankshaft or camshaft, and transmits a corresponding signal to the controller 300.

The oil temperature sensor (OTS) 113 detects temperature of oil flowing through an oil control valve (OCV), and transmits a corresponding signal to the controller 300.

The oil temperature detected by the oil temperature sensor 113 may be determined by measuring a coolant temperature using a coolant temperature sensor mounted at a coolant passage of an intake manifold. Therefore, in one form of the present disclosure, the oil temperature sensor 113 may include a coolant temperature sensor, and the oil temperature should be understood to include the coolant temperature.

The air flow sensor 114 detects an air amount drawn into the intake manifold, and transmits a corresponding signal to the controller 300.

The accelerator pedal position sensor (APS) 115 detects a degree in which a driver pushes an accelerator pedal, and transmits a corresponding signal to the controller 300. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 115. Therefore, in one form of the present disclosure, the accelerator pedal position sensor 115 may include a throttle valve position sensor, and the position value of the accelerator pedal should be understood to include an opening value of the throttle valve.

The camshaft position sensor 120 detects a change of a camshaft angle, and transmits a corresponding signal to the controller 300.

Figure 2:
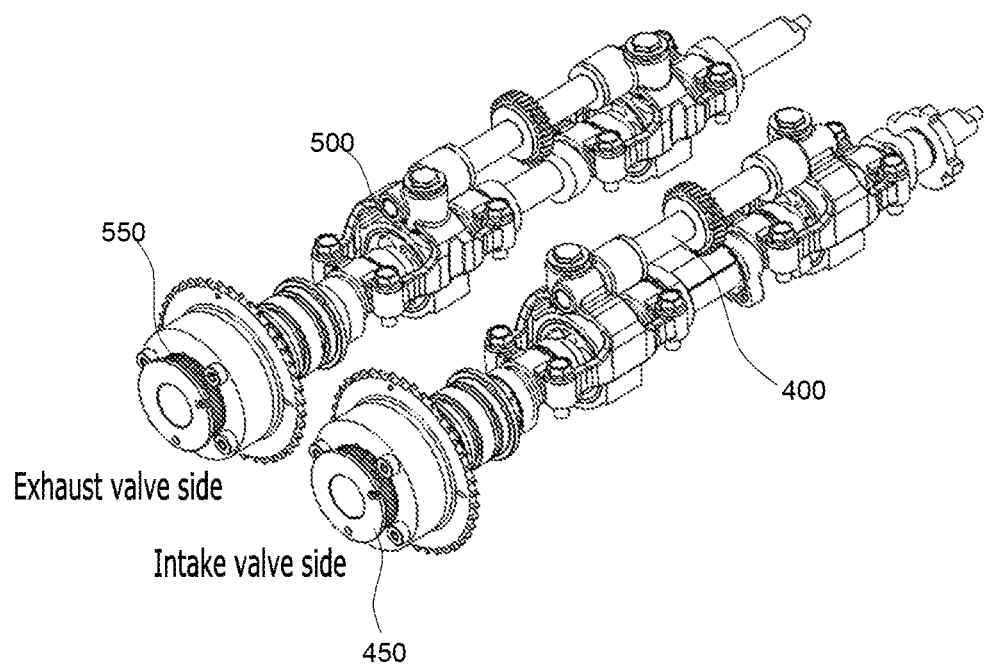
FIG. 2 is a perspective view showing a continuous variable valve duration device and a continuous variable valve timing device which is disposed on intake valve and exhaust valve sides.

FIG. 2 is a perspective view showing a continuous variable valve duration device and a continuous variable valve timing device which is disposed on intake valve and exhaust valve sides according to one form of the present disclosure.

As shown in FIG. 2, the continuous variable valve duration device 400, 500 and the continuous variable valve timing device 450, 550 are mounted at the intake and exhaust valve sides.

The intake continuous variable valve duration (CVVD) device 400 controls an opening duration of an intake valve of the engine according to a signal from the controller 300, the exhaust continuous variable valve duration (CVVD) device 500 controls an opening duration of an exhaust valve of the engine according to a signal from the controller 300.

The intake continuous variable valve timing (CVVT) device 450 controls opening and closing timing of the intake valve of the engine according to a signal from the controller 300, and the exhaust continuous variable valve timing (CVVT) device 550 controls opening and closing timing of the exhaust valve of the engine according to a signal from the controller 300.

Figure 3:
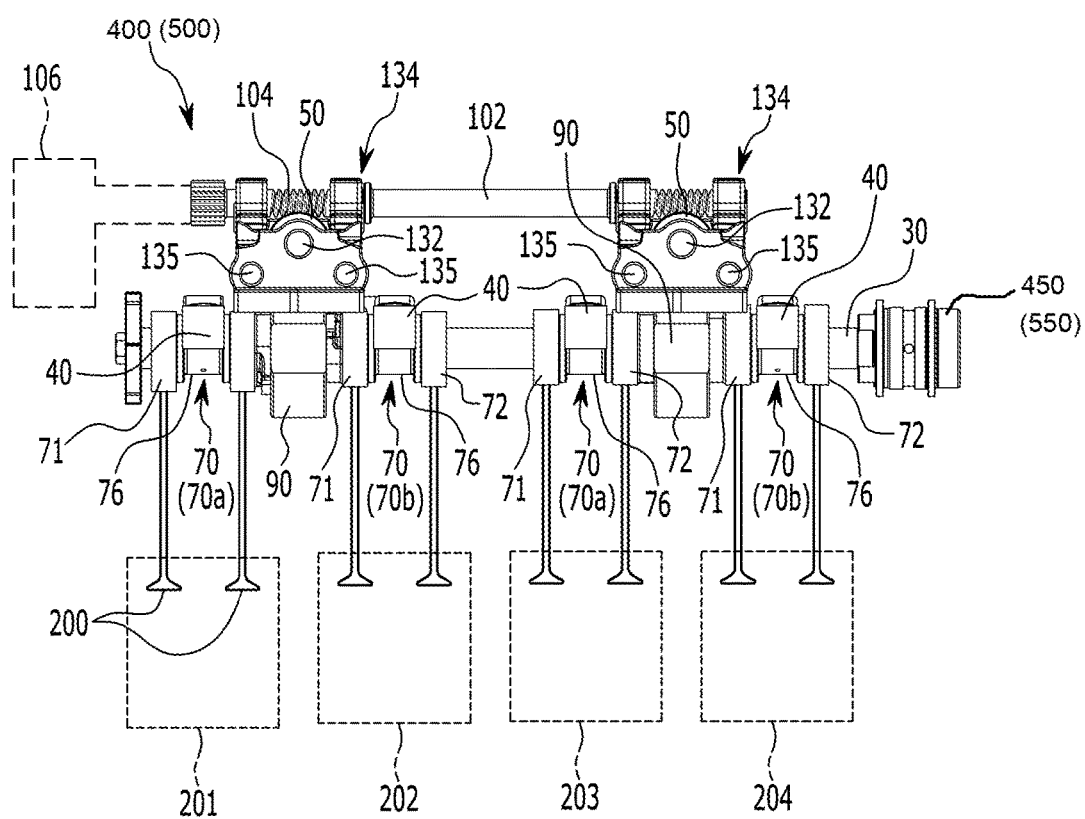
FIG. 3 is a side view of a continuous variable valve duration device assembled with a continuous variable valve timing device which is disposed on intake valve and exhaust valve sides.

FIG. 3 is a side view of the CVVD device applied to the intake and exhaust valves in another form as assembled with the CVVT for valves 200 operating with cylinders 201, 202, 203, 204. The intake CVVD device is assembled with the intake CVVT device, and the exhaust CVVD device is assembled with the exhaust CVVT device. In one form, two cams 71 and 72 may be formed on first and second cam portions 70a and 70b, and a cam cap engaging portion 76 may be formed between the cams 71 and 72 and supported by a cam cap 40. The valve 200 is opened and closed by being in contact with the cams 71 and 72.

As illustrated in FIG. 3, the CVVD device includes: a cam unit 70 in which a cam 71 is formed and into which a cam shaft 30 is inserted; an inner wheel 80 to transfer the rotation of the cam shaft 30 to the cam unit 70 (See, in FIG. 4); a wheel housing 90 in which the inner wheel 80 rotates and movable in a direction perpendicular to the camshaft 30; a guide shaft 132 having a guide thread and provided in a direction perpendicular to the camshaft 30, the guide shaft mounted by a guide bracket 134; a worm wheel 50 having an inner thread engaged with the guide thread and disposed inside the wheel housing 90; and a control shaft 102 formed with a control worm 104 meshing with the worm wheel 50. The control worm 104 is engaged with an outer thread formed on the outer side of the worm wheel 50. The CVVD device further includes a sliding shaft 135 fixed to the guide bracket 134 and guiding the movement of the wheel housing 90.

Figure 4:
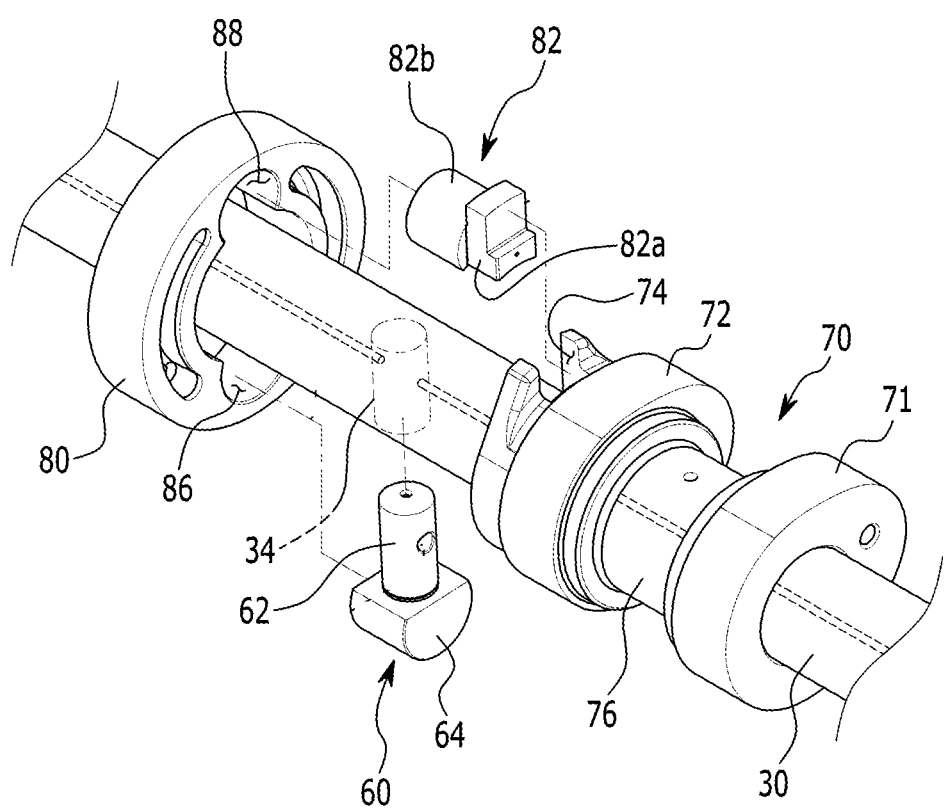
FIG. 4 is a partial view of an inner wheel and a cam unit of a continuous variable valve duration device in one form.

FIG. 4 is a partial view of the inner wheel 80 and the cam unit 70 of the CVVD device of the FIG. 3. Referring to FIG. 4, First and second sliding holes 86 and 88 are formed in the inner wheel 80, and a cam slot 74 is formed in the cam unit 70.

The CVVD device further includes: a roller wheel 60 inserted into the first sliding hole 86 allowing the roller wheel 60 to rotate; and a roller cam 82 inserted into the cam slot 74 and the second sliding hole 88. The roller cam 82 may slide in the cam slot 74 and rotate in the second sliding hole 88.

The roller cam 82 includes: a roller cam body 82a slidably inserted into the cam slot 74 and a roller cam head 82b rotatably inserted into the second sliding hole 88.

The roller wheel 60 includes: a wheel body 62 slidably inserted into the camshaft 30 and a wheel head 64 rotatably inserted into the first sliding hole 86. A cam shaft hole 34 is formed in the camshaft 30 and a wheel body 62 of the roller wheel 60 is movably inserted into the camshaft hole 34. The structure and operation of the CVVD device discussed above applies to both the intake and exhaust CVVD devices.

Figure 5A:
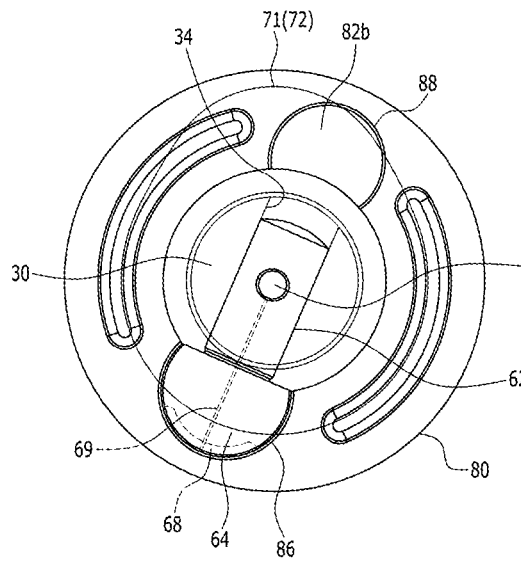
FIGS. 5A-5C are views illustrating the operation of a continuous variable valve duration device in FIG. 4.
Figure 5B:
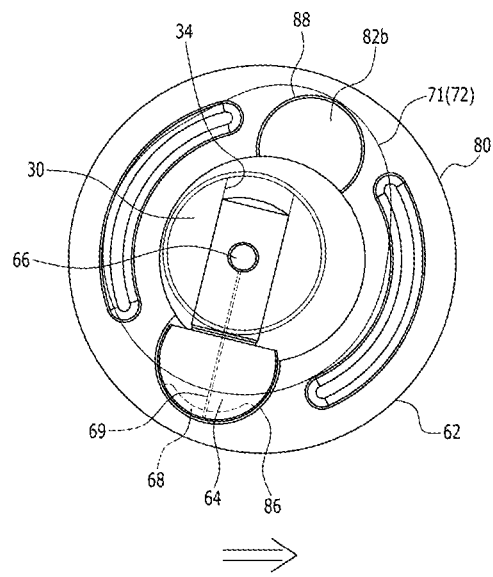
Figure 5C:
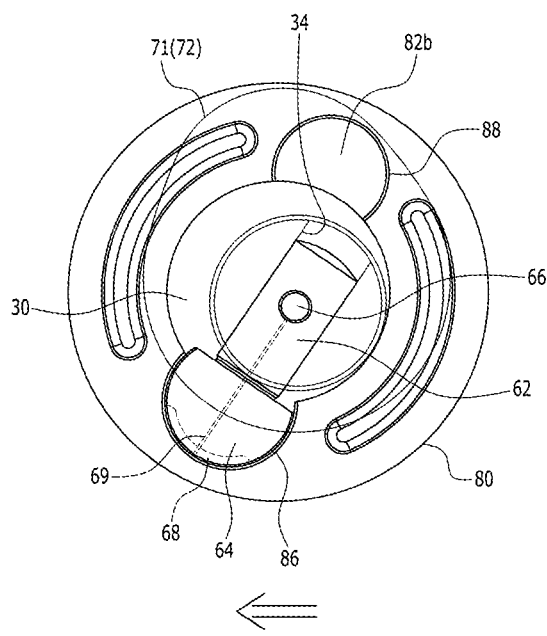

FIGS. 5A-5C illustrate the operation of the CVVD device. FIG. 5A illustrates a neutral state in which the rotational center of the camshaft 30 and the cam unit 70 coincide with each other. In this case, the cams 71 and 72 rotate at the same speed as the camshaft 30. When the controller 300 applies a control signal based on engine load and/or engine speed, a control motor 106 rotates the control shaft 102. Then, the control worm 104 rotates the worm wheel 50 which in turn rotates and moves along the guide thread formed on the guide shaft 132.

Figures 7A, 7B, 7C:
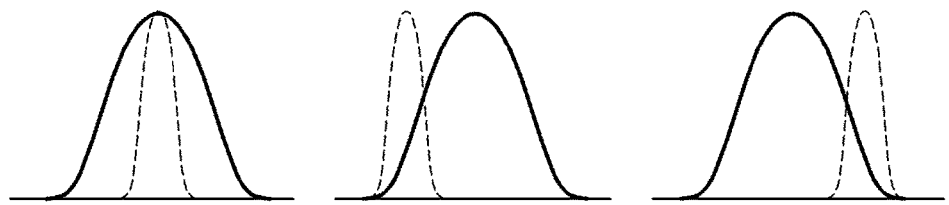
FIGS. 7A-7C are valve profiles of a continuous variable valve duration device in one form.
Figures 8A, 8B:
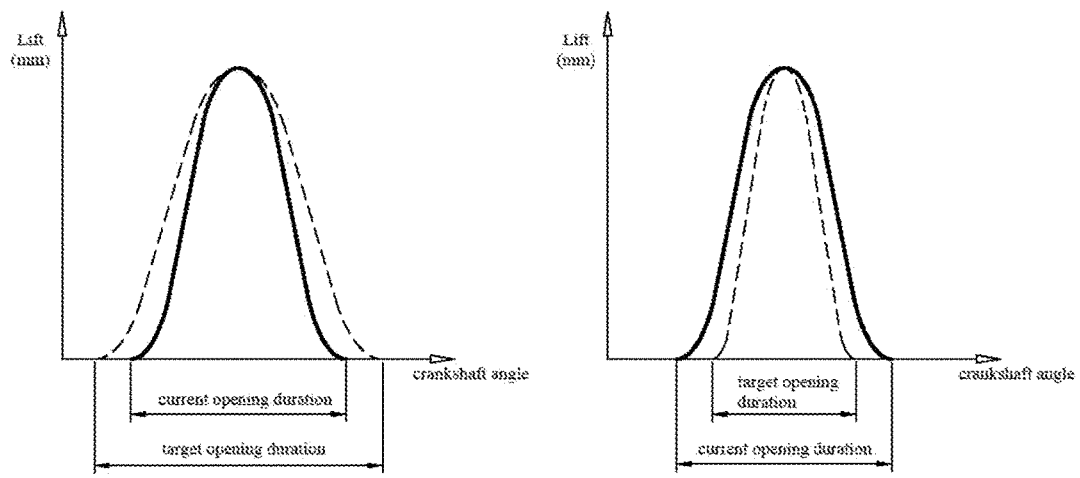

As a result, the worm wheel 50 causes a change to a position of the wheel housing 90 relative to the cam shaft 30. As illustrated in FIGS. 5B and 5C, when the position of the wheel housing 90 moves in one direction with respect to the center of rotation of the camshaft 30, the rotational speed of the cams 71, 72 with respect to the camshaft 30 are changed in accordance with their phases. FIG. 7A and FIG. 8B are drawings showing a valve profile illustrating valve opening duration change by the operation of the CVVD device (i.e., intake CVVD device, exhaust CVVD device). The solid line represents a general valve profile (e.g., a current opening duration), and the dotted line shows the valve profile as a short opening duration (e.g., a target opening duration in FIG. 8B) is applied. FIG. 8A illustrates a changed valve profile when the long opening duration is applied by the CVVD device. The controller 300 determines a target opening duration based on an engine load and an engine speed and controls the CVVD device (i.e., the intake CVVD device, the exhaust CVVD device) to modify current opening and closing timings of the valve based on the target opening duration.

More specifically, as illustrated in FIG. 8B, the CVVD device may retard the current opening timing of the intake valve while simultaneously advancing the current closing timing of the intake valve to shorten the opening duration according to a predetermined value provided by the controller 300. When the controller applies a longer opening duration (i.e., a target opening duration) than the current opening duration, as illustrated in FIG. 8A, the CVVD device may advance the current opening timing of the intake valve while simultaneously retarding the current closing timing of the intake vale so that the modified opening duration becomes longer than the current opening duration. The same operation discussed above applies to the exhaust valve to control an opening duration of the exhaust valve.

FIGS. 8C and 8D illustrate the relationship between the operation of the CVVD device and the CVVT device. As discussed above, the CVVD device may change the opening duration of a valve (e.g., intake or exhaust valve) whereas the CVVT device may shift a valve profile according to a target opening and/or a target closing timings without change to the period of the valve opening duration. It should be noted that the changing opening duration by the CVVD device may occur after changing valve opening and/or closing timings of intake or exhaust valves by the CVVT device. In another form, the operation of the CVVT device to change the opening and closing timings may occur after the operation of the CVVD device. In still another form, the operation of the CVVD and CVVT devices may perform simultaneously to change the opening duration and the timing of opening and closing of intake or exhaust valves.

Figure 6A:
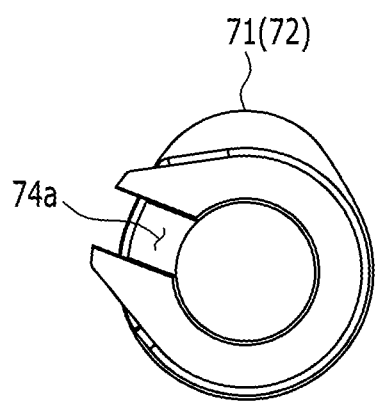
FIGS. 6A and 6B are views illustrating a cam slot of a continuous variable valve duration device in exemplary forms.
Figure 6B:
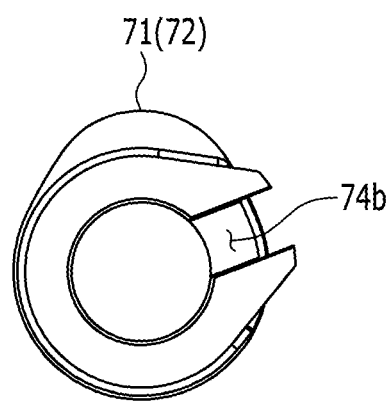

FIGS. 6A and 6B illustrate a view of the cam slot 74a, 74b of the CVVD device, and FIGS. 7A-7C illustrate valve profiles of the CVVD device in exemplary forms of the present disclosure.

Referring to FIGS. 6A-6B, the cam slot 74a may be formed in an advanced position relative to the cam 71, 72, or in another form the cam slot 74b may be formed in a retarded position relative to the cam 71, 72. In another form, the cam slot 74a, 74b may be formed to have the same phase as the lobe of the cam 71, 72. These variations are enable to realize various valve profiles. Based on the position of the cam slot 74a, 74b, and a contact position between the cam and the corresponding valve (i.e., the intake valve, the exhaust valve), the opening and closing timings of the intake valve (or exhaust valve) may vary. FIG. 7B shows that the CVVD device may advance (for a short opening duration) or retard the current closing timing (for a long opening duration) of the corresponding valve (i.e., intake valve, exhaust valve) by a predetermined value based on the target opening duration of the intake valve or exhaust valve while maintaining the current opening timing of the intake valve or the exhaust valve. In another form, as illustrated in FIG. 7C, the CVVD device may advance (for a long opening duration) or retard (for a short opening duration) the current opening timing of the intake valve or the exhaust valve by a predetermined value based on the target opening duration of the intake valve or the exhaust valve while maintaining the current closing timing of the intake valve or the exhaust valve.

The controller 300 may determine control regions depending on an engine speed and an engine load based on signals from the data detector 100 and camshaft position sensor 120, and controls the intake CVVD and CVVT devices 400 and 450, and the exhaust CVVD and CVVT devices 500 and 550 according to the control regions. Herein, the plurality of control regions may be classified into six regions.

The controller 300 applies a maximum duration (i.e., a target opening duration) to the intake valve and limits a valve overlap by using the exhaust valve in a first control region. The controller 300 applies the maximum duration to the intake and exhaust valves in a second control region, advances an intake valve closing (IVC) timing and exhaust valve closing (EVC) timing in the third control region, approaches the intake valve closing (IVC) timing to bottom dead center (BDC) in a fourth control region, controls a wide open throttle valve (WOT) so as to generate scavenging in a fifth region, controls a wide open throttle valve (WOT) and controls the intake valve closing (IVC) timing to reduce knocking in a sixth region.

For these purposes, the controller 300 may be implemented as at least one processor that is operated by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 9A to FIG. 12C.

Figure 9A:
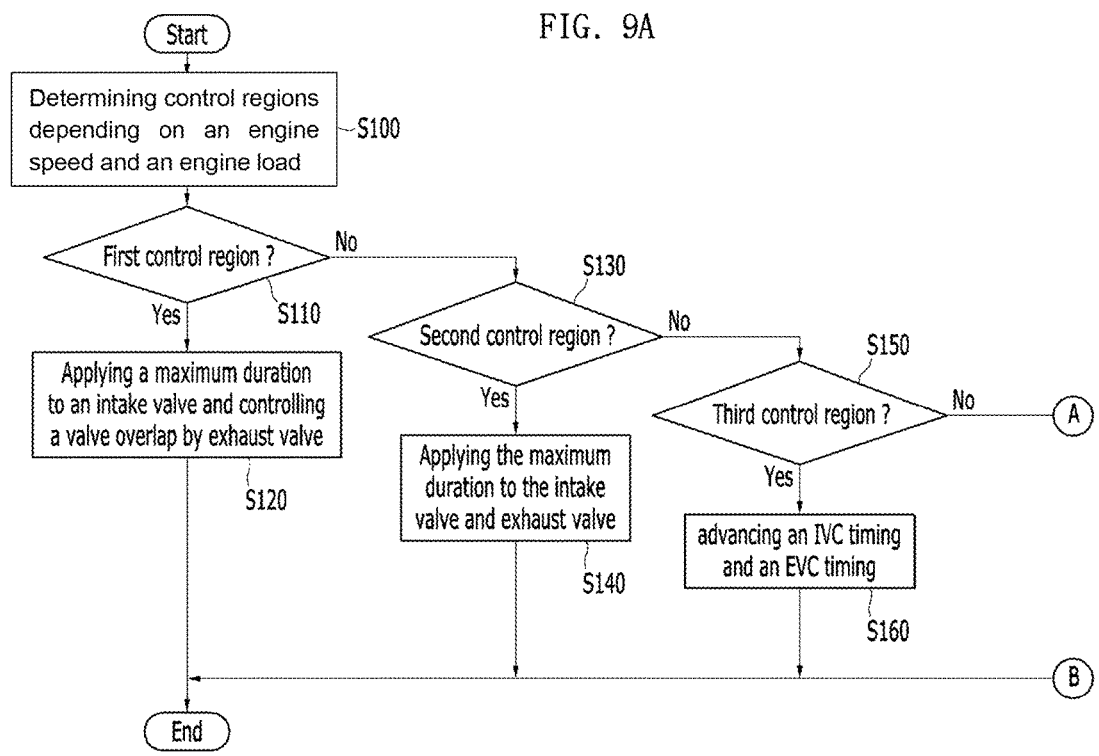
FIGS. 9A and 9B are flowcharts showing a method for controlling valve timing of a continuous variable valve duration engine.
Figure 9B:
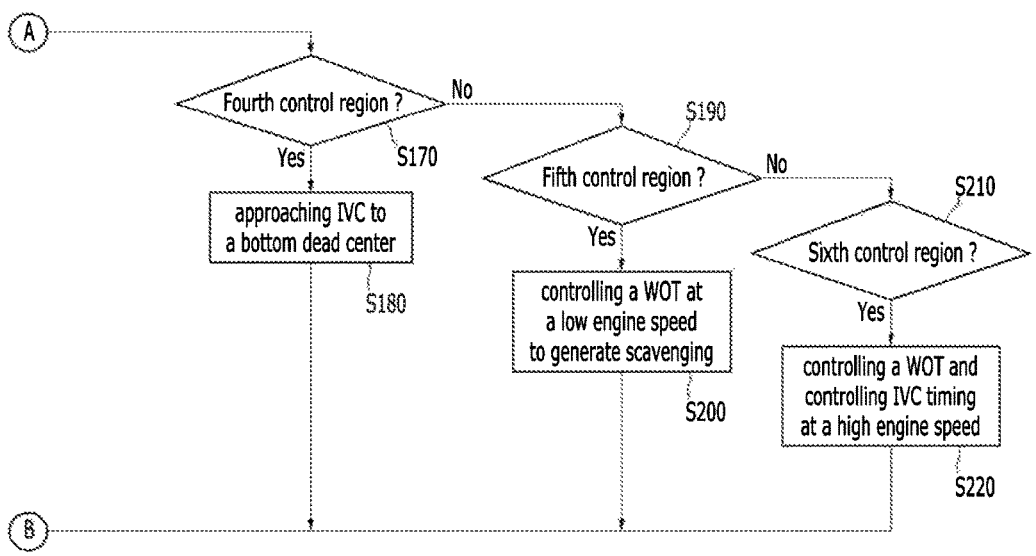
Figure 10:
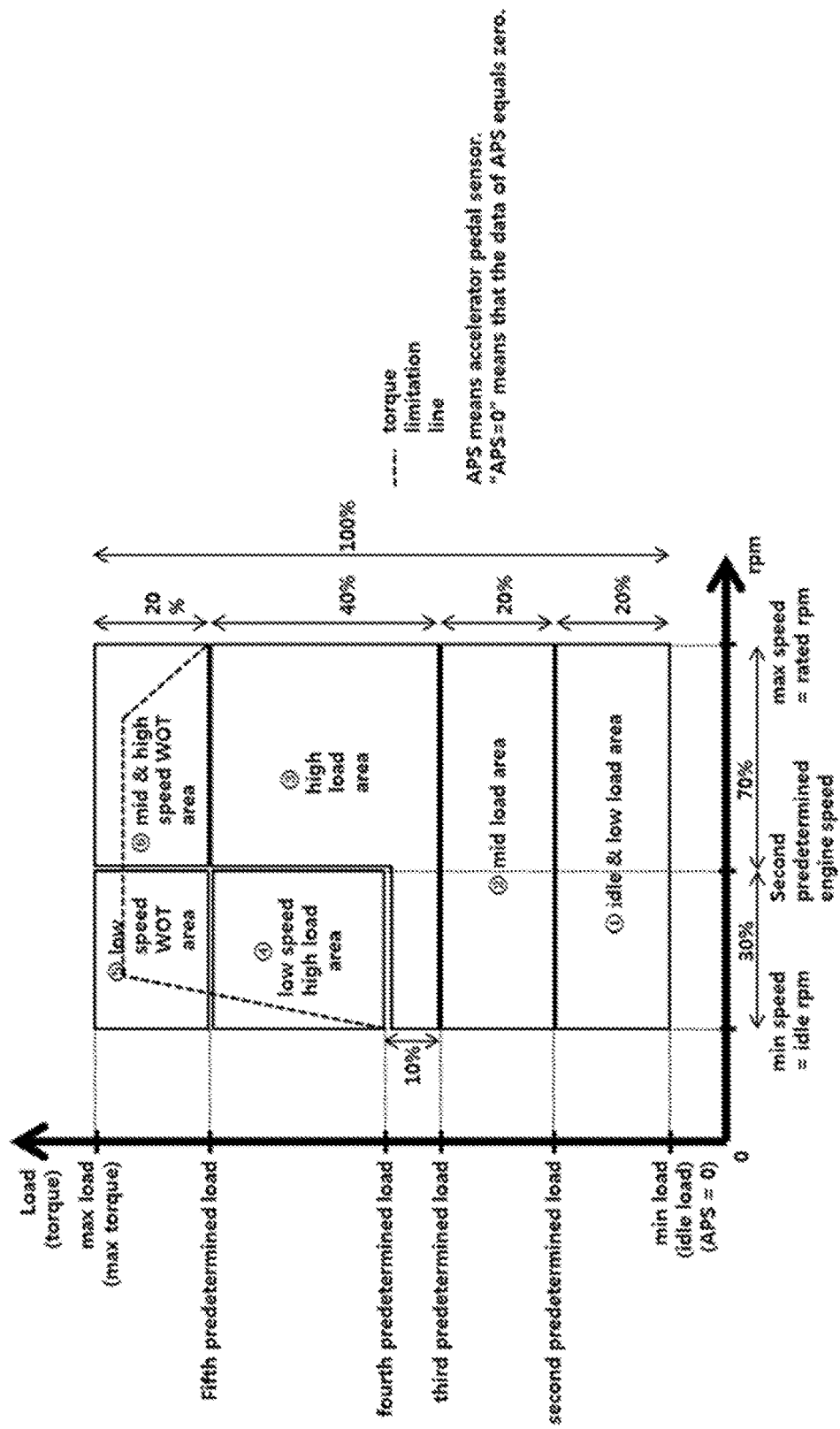
FIG. 10 is a schematic diagram illustrating control regions in one form.

FIG. 9A and FIG. 9B are flowchart showing a method for controlling valve timing of a continuous variable valve duration engine, and FIG. 10 is a schematic block diagram of showing control regions based on engine load (e.g., engine torque) and engine speed.

Figure 11A:
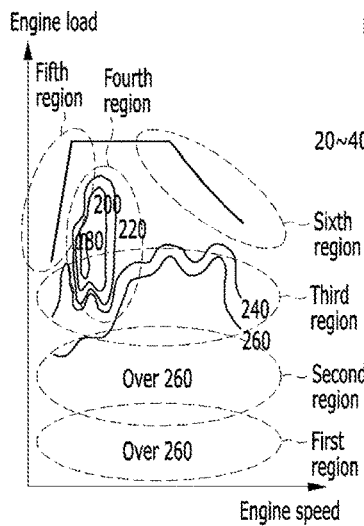
FIGS. 11A-11C are graphs showing duration, opening timing, and closing timing of an intake valve depending on an engine load and an engine speed.
Figure 11B:
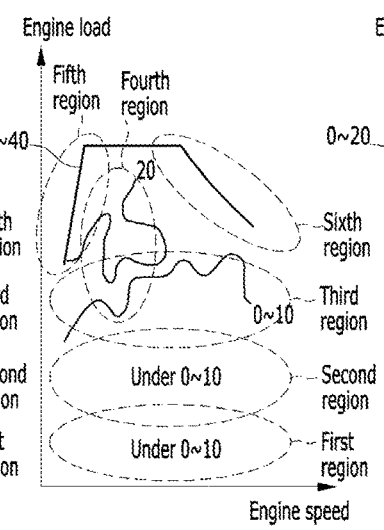
Figure 11C:
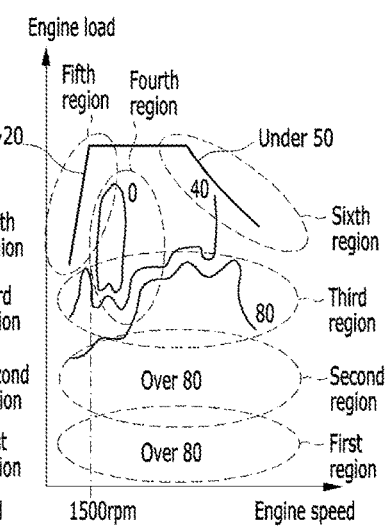
Figure 12A:
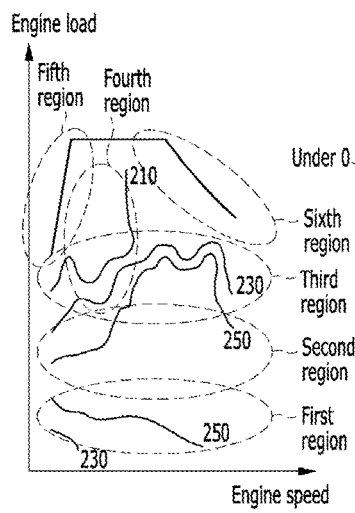
FIGS. 12A-12C are graphs showing duration, opening timing, and closing timing of an exhaust valve depending on an engine load and an engine speed.
Figure 12B:
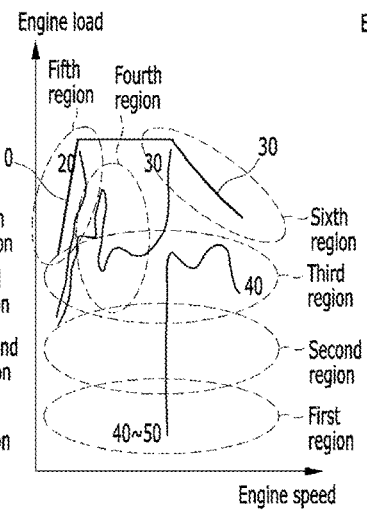
Figure 12C:
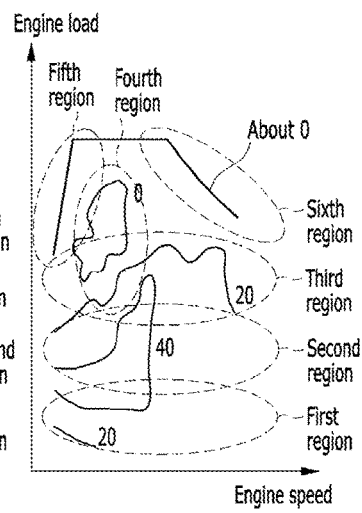

In addition, FIGS. 11A-11C are graphs respectively showing duration, opening timing, and closing timing of an intake valve depending on an engine load and an engine speed, and FIGS. 12A-12C are graphs respectively showing duration, opening timing, and closing timing of an exhaust valve depending on an engine load and an engine speed.

As shown in FIG. 9A and FIG. 9B, a method for controlling valve timing of a continuous variable valve duration engine starts with determining control regions based on an engine speed and an engine load by the controller 300 at step S100. The control region may be divided into six control regions (e.g., first, second, third, fourth, fifth and sixth control regions).

The first to sixth control regions are indicated in FIG. 10, and FIG. 11A to FIG. 12C in more detail. FIG. 10 schematically describes the control regions based on the engine load (e.g., engine torque) and engine speed (e.g., revolutions per minutes "rpm"). However, the control regions may vary based on engine type or engine size. Mixed control may be performed at the boundary of each region to minimize the control impact of the engine. Accordingly, the range of each region shown in the present application is exemplary, and the classification of each region may be varied.

The controller 300 may determine control regions as a first control region (namely, ① an idling region or a low-load condition) when the engine load is between a first predetermined load (e.g., a minimum engine torque) and a second predetermined load, a second control region (namely, ② an mid-load condition) when the engine load is greater than the second predetermined load and equal to or less than a third predetermined load, and a third control region (namely, ③ a high-load condition) where the engine load is greater than the third predetermined load and less than a fourth predetermined load and the engine speed is between a first predetermined speed (e.g., an idle rpm) and a second predetermined speed, or where the engine load is greater than the third predetermined load and equal to or less than a fifth predetermined load and the engine speed is between the second predetermined speed and a third predetermined speed (i.e., an engine maximum rpm).

In addition, the controller 300 may determine a fourth control region (namely, ④ a low-speed and high-load condition) when the engine load is greater than the fourth predetermined load and equal to or less than a fifth predetermined load and the engine speed is equal to or greater than the first predetermined speed and equal to or less than the second predetermined speed, a fifth control region (namely, ⑤ a low speed-wide open throttle "WOT" condition) when the engine load is greater than the fifth predetermined load and equal to or less than a maximum engine load and the engine speed is between the first and second predetermined speeds, and a sixth control region (namely, ⑥ an mid-high speed-WOT condition) when the engine load is greater than the fifth predetermined load and equal to or less than the maximum engine load and the engine speed is greater than the second predetermined speed and equal to or less than a third predetermined speed (e.g., an engine maximum rpm).

Referring to FIG. 10, the first predetermined load (e.g., a minimum engine torque) is measured when a input from the APS is zero "0," and the second to fifth predetermined loads, and the second and third predetermined engine speeds may be calculated by the following equations:

Second predetermined load=$min\_L+(1/5)\times(max\_L-min\_L)$;

Third predetermined load=$min\_L+(2/5)\times(max\_L-min\_L)$;

Fourth predetermine load=$min\_L+(1/2)\times(max\_L-min\_L)$;

Fifth predetermined load=$min\_L+(4/5)\times(max\_L-min\_L)$;

Second predetermined engine speed=$min\_S+(3/10)\times(max\_S-min\_S)$; and

Third predetermined engine speed=$max\_S$, where, min_L is the minimum engine torque; max_L is a maximum engine torque; min_S is a minimum engine rpm (e.g., Idle rpm); and max_S is a maximum engine rpm.

Meanwhile, referring the FIGS. 11A-11C and FIGS. 12A-12C, a crank angle is marked in an intake valve duration (VD) map and an exhaust valve duration (EVD) map, which indicating the opening time of the intake valve and exhaust valve. For example, regarding the IVD map in the FIG. 11A, a curved line written as a number 200 at inner side of the fourth region means that the crank angle is 200 degrees, a curved lined marked as a number 220 at outer side of the number 200 means that the crank angle is 220 degrees.

Although not shown in the drawing, the crank angle which is more than 200 less than 220 is positioned between the curved line of the number 200 and the curved line of the number 220.

In addition, a unit of number designated in an intake valve opening (IVO) timing map is before top dead center (TDC), a unit of number designated in an intake valve closing (IVC) timing map is after bottom dead center (BDC), a unit of number designated in an exhaust valve opening (EVO) timing map is before BDC, and a unit of number designated in an exhaust valve closing (EVC) map is after TDC.

Each region and curved line in the FIGS. 11A-11C and FIGS. 12A-12C are an example of the one form of the present disclosure, it may be modified within the technical idea and scope of the present disclosure.

Referring to the FIGS. 9A to 12C, the control regions are determined according to the engine speed and load in the step of S100. After that, the controller 300 determines whether the engine state is under the first control region at step S110.

In the step of S110, if the engine load is between first and second predetermined loads, the controller 300 determines that the engine state is under the first control region. At this time, the controller 300 applies a maximum duration, or a first intake opening duration to the intake valve and controls the valve overlap between the exhaust valve and intake valve at step S120.

The valve overlap is in a state of that the intake valve is opened and the exhaust valve is not closed yet.

In other words, when the engine is under low load, then the controller 300 may control both the intake valve opening (IVO) timing and the intake valve closing (IVC) timing being fixed such that the intake valve has a maximum duration value. In other words, the controller 300 controls the intake CVVD device to adjust a current opening duration to the first intake opening duration by advancing the IVO timing and retarding the IVC timing.

As shown in FIGS. 11B and 11C, the first control region may be 0 to 10 degrees before TDC in the IVO timing map and 100 to 110 degrees after BDC in the IVC timing map.

Also, the controller 300 may control the EVO timing to be fixed and set up the EVC timing. Meanwhile, as the valve overlap is increased, the fuel consumption is cut, whereas the combust stability is deteriorated. Accordingly, properly setting the valve overlap is desired. However, according to the present disclosure, it is possible to get highly improved fuel-efficiency by setting optimal valve overlap up, which fixing the EVO timing and controlling the EVC timing to be set up at maximum value within sustainable combust stability. The timing value may be determined by predetermined map.

For example, as shown in FIG. 12B-12C, the EVO timing may be fixed at 40 to 50 degrees before BDC, the EVC timing may be established by moving the degrees thereof in an after TDC direction. The EVC timing may be maximum value such that the combust stability is sustainable.

When the current engine state does not belong to the first control region at the step S110, the controller 300 determines whether the current engine state belongs to the second control region at step S130. However, each of the control regions may be determined immediately by the controller 300 based on the engine load and/or engine speed.

In the step of S130, if the engine load is greater than the second predetermined load and equal to or less than the third predetermined load, the controller 300 determines that the engine state is under the second control region. At this time, the controller 300 controls both the intake valve and exhaust valve respectively having maximum duration consistently at step S140. In another form, the controller 300 may set the target opening duration of the intake valve to a second intake opening duration in the second control region, and the controller 300 controls the intake CVVD device to adjust the current opening duration to the second intake opening duration. The second opening duration may be set to be longer than the first intake opening duration.

The controller 300 may control the EVC timing to be late as the engine load is increased in order that the exhaust valve reaches the maximum duration. Herein, the controller 30 may fix both the IVO timing and the IVC timing and apply maximum duration to the exhaust valve in company with maximum duration to the intake valve already applied.

Meanwhile, it is desired for naturally aspirated engine to be kept being manifold absolute pressure (MAP), which is the difference between atmospheric pressure and pressure of intake manifold. However, the turbo engine according to one form of the present disclosure doesn't have to be controlled because the turbo engine is boosted and the pressure of the intake manifold is greater than the atmospheric pressure.

The controller 300 determines whether the current engine state belongs to the third control region at step S150.

In the step of S150, when the engine load is greater than the third predetermined load and less than a fourth predetermined load and the engine speed is between first and second predetermined speeds, or when the engine load is greater than the third predetermined load and equal to or less than a fifth predetermined load and the engine speed is between the second predetermined speed and a third predetermined speed, the controller 300 determines that the engine state is under the third control region. At this time, the controller 300 advances the IVC timing and EVC timing at step S160.

The IVC timing is controlled at the LIVC position (Late Intake Valve Closing; an angle of 100-110 degrees after BDC, referring the FIGS. 11A-11C) in the first and second control regions. By the way, since the IVC timing is delayed at the LIVC position, the average pressure in the intake manifold(boost pressure) may be increased and the knocking is generated as the engine load is increased. Accordingly, the fuel efficiency may be deteriorated. Therefore, the controller 300 advances the IVC timing to inhibit or prevent effect as described above in the third control region which has relatively higher load.

At this time, the controller 300 may rapidly advance the IVC timing close to BDC when the engine speed is less than the predetermined speed so as to reflect characteristic of the turbo engine, as shown in FIGS. 11A-11C. In addition, if the engine speed is greater or equal to the predetermined speed, the controller 300 may slowly advance the IVC timing at an angle of 30-50 degrees after BDC because the boost pressure is relatively lower. The predetermined speed may be 1500 rpm.

Furthermore, as shown in FIGS. 12A-12C, the difference between the IVO timing and EVC timing is maximized in the second region, the valve overlap becomes the longest. An optimal EVC timing value is realized by keeping the EVO timing and advancing the EVC timing close to the TDC in the third control region. Accordingly the fuel efficiency may be more improved.

When the current engine state does not belong to the third control region at the step S150, the controller 300 determines whether the current engine state belongs to the fourth control region at step S170. In another form, the controller 300 may determine the condition for the fourth control region without performing the step of determining the first, second and third control regions.

If the engine state is under the fourth control region in the S170, the controller 300 controls the IVC timing close to the BDC at step S180.

The fourth control region may be a low boost region (or, a low-speed and high-load region) that the engine load is greater than the fourth predetermined load and equal to or less than the fifth predetermined load and the engine speed is greater than or equal to the first predetermined speed and less than the second predetermined speed. For example, the first predetermined speed (i.e., an idle rpm) may be 1500 rpm or less, and the second predetermined speed may be 2500 rpm.

The controller 300 controls the IVC timing close to BDC in the fourth region due to improving fuel efficiency. In addition, the controller 300 may shorten the valve overlap between the intake valve and the exhaust valve and improve the combust stability by approaching the IVO timing and EVC timing close to the TDC. Accordingly, short intake duration (e.g., 180 degrees) may be used in the fourth control region.

When the current engine state does not belong to the fourth control region at the step S170, the controller 300 determines whether the current engine state belongs to the fifth control region at step S190.

In the S190, if the engine load is greater than the fifth predetermined load and equal to or less than a maximum engine load and the engine speed is between the first and second predetermined speeds, then the controller 300 determines that the engine state is under the fifth control region. At this time, the controller 300 fully opens a throttle valve and controls to generate scavenging at step S200. More specifically, the fresh air at a higher pressure than that of the burned gases (combustion gas) scavenges the burned gases and evacuates them through the exhaust valve, thus filling the space freed by these gases.

In the turbo engine, if the throttle valve is controlled to be wide open (Wide Open Throttle "WOT") when the engine speed is equal to or greater than the first predetermined speed (e.g., an idling rpm) and less than the second predetermined speed (e.g., 2500 rpm), intake port pressure becomes higher than exhaust port pressure by boosting. Therefore, an effect of a scavenging phenomenon which emits combustion gas of the exhaust is prominent in the turbo engine compared to a natural aspirated engine.

Accordingly, as shown in FIGS. 11A-11C, the controller 300 may advance the IVO timing at an angle of 20-40 degrees before BDC to generate the scavenging, and control the IVC timing at angle of 0-20 degrees after BDC.

Moreover, as shown in FIGS. 12A-12C, the controller 300 may sufficiently delay the EVO timing to after BDC so as to maximally generate the scavenging by reducing interference of exhaust. Furthermore, the EVC timing may be controlled within an angle of 30 degrees after TDC in order to maintain catalyst temperature. Accordingly, short exhaust duration (e.g., 180-210 degrees) may be used in the fifth control region.

When the current engine state does not belong to the fifth control region at the step S190, the controller 300 determines whether the current engine state belongs to the sixth control region at step S210.

In the step of S210, if the engine load is greater than the fifth predetermined load and equal to or less than the maximum engine load and the engine speed is greater than the second predetermined speed and less than a third predetermined speed (e.g., a maximum rpm of an engine), then the controller determines the engine state is under the sixth control region. At this time, the controller 300 fully opens a throttle valve and controls IVC timing in order to reduce the knocking at step S220.

When the engine speed is greater than a predetermined speed (e.g., approximately 3500 rpm) in the sixth control region, the scavenging phenomenon disappears because exhaust port pressure is much higher than intake port pressure. Therefore, as shown in FIGS. 12A-12C, the controller 300 advances the EVO timing an angle of 30 degrees before BDC and approaches the EVC timing close to the TDC to inhibit or prevent an exhaust pumping.

Meanwhile, when WOT control is performed at a high speed condition, knocking is rarely generated in the natural aspirated engine, on the contrary, knocking may be deteriorated in the turbo engine. Thus, as shown in FIGS. 11A-11C, the controller 300 may advance the IVC timing within an angle of 50 degrees after BDC to reduce knocking by decreasing boost pressure.

As described above, duration and timing of the continuous variable valve are simultaneously controlled, so the engine may be controlled under desired conditions.

That is, since opening timing and closing timing of the intake valve and the exhaust valve are appropriately controlled, thereby improving fuel efficiency under a partial load condition and engine performance under a high load condition. In addition, a starting fuel amount may be reduced by increasing a valid compression ratio, and exhaust gas may be reduced by shortening time for heating a catalyst.

While this present disclosure has been described in connection with what is presently considered to be practical forms, it is to be understood that the present disclosure is not limited to the disclosed forms. On the contrary, it is intended to cover various modifications and equivalent arrangements included within the spirit and scope of the present disclosure.

What is claimed is:

1. A method for controlling intake and exhaust valves of an engine, the method comprising:
    controlling, by an intake continuous variable valve timing (CVVT) device, opening and closing timings of the intake valve;
    controlling, by an exhaust CVVT device, opening and closing timing of the exhaust valve;
    determining, by a controller, a target opening duration of the intake valve, a target opening duration of the exhaust valve, and at least one of a target opening timing or a target closing timing of the intake valve and the exhaust valve, based on an engine load and an engine speed;
    modifying, by an intake continuous variable valve duration (CVVD) device, current opening and closing timings of the intake valve based on the target opening duration of the intake valve;
    modifying, by an exhaust CVVD device, current opening and closing timings of the exhaust valve based on the target opening duration of the exhaust valve;
    advancing, by the intake CVVD device, the current opening timing of the intake valve while simultaneously retarding the current closing timing of the intake valve by a predetermined value and while maintaining a maximum amount of a valve lift of the intake valve at a same level, or retarding the current opening timing of the intake valve while simultaneously advancing the current closing timing of the intake valve by a predetermined value while maintaining the maximum amount of the valve lift of the intake valve at the same level, based on the target opening duration of the intake valve;
    advancing, by the exhaust CVVD device, the current opening timing of the exhaust valve while simultaneously retarding the current closing timing of the exhaust valve by a predetermined value while maintaining a maximum amount of a valve lift of the exhaust valve at a same level, or retarding the current opening timing of the exhaust valve while simultaneously advancing the current closing timing of the exhaust valve by a predetermined value while maintaining the maximum amount of the valve lift of the exhaust valve at the same level, based on the target opening duration of the exhaust valve;
    determining, by the controller, a third control region where the engine load is greater than a third predetermined load and less than a fourth predetermined load and the engine speed is between first and second predetermined speeds, or where the engine load is greater than the third predetermined load and equal to or less than a fifth predetermined load and the engine speed is between the second predetermined speed and a third predetermined speed; and
    advancing, by the intake CVVT device in the third control region and when the engine speed is less than a predetermined speed, the current closing timing of the intake valve to be closer to a bottom dead center (BDC) than in a second control region where the engine load is greater than a second predetermined load and equal to or less than the third predetermined load; or advancing the current closing timing of the intake valve to an angle after BDC when the engine speed is greater than or equal to the predetermined speed.

2. The method of claim 1, wherein the intake CVVD device advances the current opening timing of the intake valve while simultaneously retarding the current closing timing of the intake valve when the target opening duration of the intake valve is longer than a duration between the current opening timing and current closing timing of the intake valve.

3. The method of claim 1, wherein the intake CVVD device retards the current opening timing of the intake valve while simultaneously advancing the current closing timing of the intake valve when the target opening duration of the intake valve is shorter than a duration between the current opening timing and current closing timing of the intake valve.

4. The method of claim 1, wherein the exhaust CVVD device advances the current opening timing of the exhaust valve while simultaneously retarding the current closing timing of the exhaust valve when the target opening duration of the exhaust valve is longer than a duration between the current opening timing and current closing timing of the exhaust valve.

5. The method of claim 1, wherein the exhaust CVVD device retards the current opening timing of the exhaust valve while simultaneously advancing the current closing timing of the exhaust valve when the target opening duration of the exhaust valve is shorter than a duration between the current opening timing and current closing timing of the exhaust valve.

6. The method of claim 1, further comprising the step of adjusting, by the intake CVVT device, the current opening and closing timings of the intake valve to the target opening and closing timings of the intake valve, respectively.

7. The method of claim 1, further comprising the step of adjusting, by the exhaust CVVT device, the current opening and closing timings of the exhaust valve to the target opening and closing timings of the exhaust valve, respectively.

8. The method of claim 1, wherein, during the step of determining the target opening duration of the intake valve, the controller sets the target opening duration of the intake valve to a first intake opening duration in a first control region where the engine load is between first and second predetermined loads, and the controller controls the intake CVVD device to adjust a current intake opening duration to the first intake opening duration.

9. The method of claim 8, wherein, during the step of determining the target opening duration of the intake valve, the controller sets the target opening duration of the intake valve to a second intake opening duration in a second control region where the engine load is greater than the second predetermined load and equal to or less than the third predetermined load, and the controller controls the intake CVVD device to adjust the current intake opening duration to the second intake opening duration, and wherein the second intake opening duration is longer than the first intake opening duration.

10. The method of claim 1, wherein, during the step of determining the target opening duration of the exhaust valve, the controller sets the target opening duration of the exhaust valve to a first exhaust opening duration in a first control region where the engine load is between first and second predetermined loads, and the controller controls the exhaust CVVD device to adjust a current exhaust opening duration to the first exhaust opening duration.

11. The method of claim 10, wherein, during the step of determining the target opening duration of the exhaust valve, the controller sets the target opening duration of the exhaust valve to a second exhaust opening duration in a second control region where the engine load is greater than the second predetermined load and equal to or less than the third predetermined load, and the controller controls the exhaust CVVD device to adjust the current exhaust opening duration to the second exhaust opening duration, and wherein the second exhaust opening duration is longer than the first exhaust opening duration.

12. The method of claim 1, further comprising the step of advancing, by the exhaust CVVT device, the current closing timing of the exhaust valve in the third control region to be closer to a top dead center than in the second control region, while keeping an exhaust valve opening (EVO) timing up in the third control region.

13. The method of claim 1, further comprising the step of determining a fourth control region, by the controller, where the engine load is greater than the fourth predetermined load and equal to or less than a fifth predetermined load and the engine speed is equal to or greater than the first predetermined speed and equal to or less than the second predetermined speed; and controlling, by the intake CVVT device in the fourth control region, the current closing timing of the intake valve to be closer to BDC than in the second control region, the current opening timing of the intake valve to be farther from a top dead center (TDC) than in the third control region, and the current closing timing of the exhaust valve to be closer to the TDC than in the third control region.

14. The method of claim 1, further comprising the step of determining, by the controller, a fifth control region where the engine load is greater than the fifth predetermined load and equal to or less than a maximum engine load and the engine speed is between the first and second predetermined speeds, and advancing, by the intake CVVT device, the current opening timing of the intake valve opening (IVO) to be an angle before a top dead center and retarding the current closing timing of the intake valve to be an angle after a bottom dead center such that an fresh air introduced into a cylinder evacuates a combustion gas from the cylinder.

15. The method of claim 14, further comprising the step of retarding, by the exhaust CVVT device, the current opening timing of the exhaust valve to be an angle after a bottom dead center in the fifth control region so as to reduce interference of exhaust, and controlling the current closing timing of the exhaust valve to an angle after a top dead center to maintain a catalyst temperature.

16. The method of claim 1, further comprising the step of determining, by the controller, a sixth control region where the engine load is greater than the fifth predetermined load and equal to or less than a maximum engine load and the engine speed is greater than the second predetermined speed and equal to or less than a third predetermined speed; and advancing, by the exhaust CVVT device in the sixth control region, the current opening timing of the exhaust valve to be an angle before a bottom dead center to inhibit an exhaust pumping and to lower boost pressure, and controlling the current closing timing of the exhaust valve to be at a top dead center.

* * * * *